United States Patent [19]
Hospodor

[11] Patent Number: 4,851,998
[45] Date of Patent: Jul. 25, 1989

[54] METHOD FOR ANALYZING PERFORMANCE OF COMPUTER PERIPHERALS

[75] Inventor: Andrew D. Hospodor, Santa Clara, Calif.

[73] Assignee: I/O XEL, Inc., Santa Clara, Calif.

[21] Appl. No.: 57,547

[22] Filed: Jun. 3, 1987

[51] Int. Cl.$^4$ .............................................. G06F 1/00
[52] U.S. Cl. ................................................. 364/300
[58] Field of Search ....................... 364/200, 300, 900

[56] References Cited

U.S. PATENT DOCUMENTS 4,371,924  2/1983  Schaefer et al. .................... 364/200

Primary Examiner—Raulfe B. Zache
Attorney, Agent, or Firm—Rosenblum, Parish & Bacigalupi

[57] ABSTRACT

A process for uniformly measuring the performance characteristic of a computer peripheral by accommodating for variations in the clock rate of the host computer system is disclosed, where after connecting the target to the host and initializing the system automatically calibrates itself to the clock rate of the host and determines the parameters of the target. The user may then define a select test, a set of test, or a continuous set of tests to be run on the target. In performing the selected test or tests, the system determines the amount of overhead time associated with the host and target, and the data transfer time, before determining the various base access times of the target. Upon the determination of a base access time, the host overhead time is then removed to yield an accurate access time measurement that is independent of variable characteristics of the host computer system.

13 Claims, 5 Drawing Sheets

METHOD FOR ANALYZING PERFORMANCE OF COMPUTER PERIPHERALS

BACKGROUND OF THE INVENTION

1. Field of the Invention

The invention relates generally to the analysis of performance characteristics of computer peripherals. In particular, the invention relates to a process for uniformly measuring the performance characteristics of personal computer peripherals by accommodating for variations in personal computer clock rates.

2. Brief Description of the Prior Art

In the past, a number of devices have been developed which measure the performance characteristics of computer peripherals, or targets which are typically external memory storage devices, such as Winchester disk drives, tape drives, floppy disk drives or optical drives. Analysis devices used for testing Winchester disk drives (hard disk drives), such as the Flexstar Model 5000, Wilson Model MWX 1000, or Gould Biomation Model K100-D Logic Analyzer, typically measure such characteristics as the rotational speed of the disks, seek time of the read/write head, and hard and soft error counts. A number of other similar devices exist for analyzing other types of storage systems.

Although many of the prior art analysis devices are adaptable to use with a variety of hard disks, they generally are not adaptable to use with other types of SCSI targets. In addition, such devices are typically stand alone systems, meaning they are comprises of a separate microprocessor control and associated electronics, keyboard and display, as well as meaning that they require a distinct operating system program for use. In order for an operator to use such a device, the operator must first learn the programming language that is unique to the particular device being used. Thus, aside from their inflexibility, such analysis devices are not practical for applications outside of the laboratory or manufacturing environment.

A number of peripheral manufacturers have designed their own analysis software programs, in place of the previously mentioned analysis devices, that are generally compatible with either IBM or Apple bases systems, or other odd operating based systems. Such programs are similarly capable of measuring seek times, rotation speeds, hard and soft errors, etc., but are typically limited in application to the computer system upon which it was designed. The reasoning behind the program limited utility is related to the particular computer system upon which the program was designed to run, and the clock rate of that system. In other words, a system designed to operate on one particular type of personal computer and for measuring one particular make of drive would be incompatible with many other personal computers and would most likely give incorrect or misleading performance analysis results of other makes of drives.

A significant drawback to using either the prior art programs or analysis devices concerns the variation in results that can be achieved from tests run on the same particular drive on a variety of different systems with mismatched clock rates. A number of these tests, such as the rate at which a target writes and retrieves data from storage areas within the device (the access time), are crucial performance characteristics of the target. While hard and soft error determinations are also extremely important (and may also be determined by the preferred embodiment of the present invention), there aree a large number of currently available means for reliably making such determinations. However, there has been no previously available means for accurately determining the operational timing characteristics of a variety of drives on a variety of personal computers with different clock rates, while yielding uniform comparable results.

Although most IBM compatible personal computers outwardly appear similar, the rate at which different systems (or hosts) process information varies greatly according to the host's CPU clock frequency, which range from 4.77-10.00 MHz. Other factors, such as the length of communication cable connected to the target, create additional minor variations in the amount of time required to communicate between the target and the host system. In other words, variations in the clock rates and physical characteristics of the different hosts, upon which a particular target is tested, will result in significant variations in the amount of time required to access data, even though an identical target is used during each test. Accordingly, a manufacturer either using another company's analysis system or its own program may measure one particular average access time for its drive, while customers of the manufacture may experience much slower average access times for the same drive on their own system. Likewise, the access times of targets produced by a number of competing manufactures, as reported in specifications or sales literature, may be strikingly similar, depending on the type of test used by each manufacture, while the actual access times of each drive as tested on other analysis devices or host systems may be quite different.

SUMMARY OF THE PRESENT INVENTION

In view of the foregoing, it is an object of the present invention to provide a process for accurately determining the operational timing characteristics of computer peripherals on a wide variety of host systems.

It is another object of the present invention to provide a process for analyzing the performance characteristics of computer peripherals in which a measured host overhead time is removed from reported test results.

It is another object of the present invention to provide a process for analyzing the performance characteristics of computer peripherals in terms of operation time dedicated to target overhead.

A further object of the present invention is to provide a process for accurately determining the continuous data transfer rate that a computer peripheral is capable of maintaining.

A still further object of the present invention is to provide a process for accurately determining the typical, average, and maximum access time characteristics of a target device.

The foregoing and other objects, features, and advantages of the present invention will be apparent from the following description and drawing of the preferred embodiment of the present invention.

Briefly, a preferred embodiment of the present invention includes a process for analyzing the performance of an SCSI peripheral target device when connected to an IBM personal computer compatible host. After connecting the target to the host and initializing the sytem, the system automatically calibrates itself to the clodk rate of the host and determines the parameters of the target. The user may then define a select test, a set of test, or a continuous set of tests to be run on the target. In performing the selected test or tests, the system determines the amount of overhead time associated with the host and target, and the data transfer time before determining the various base access times of the target. Upon the determination of a base access time, the host overhead time is then removed to yield an accurate access time measurement that is independent of variable characteristics of the host computer system.

DESCRIPTION OF THE PREFERRED EMBODIMENT

Figure 1:
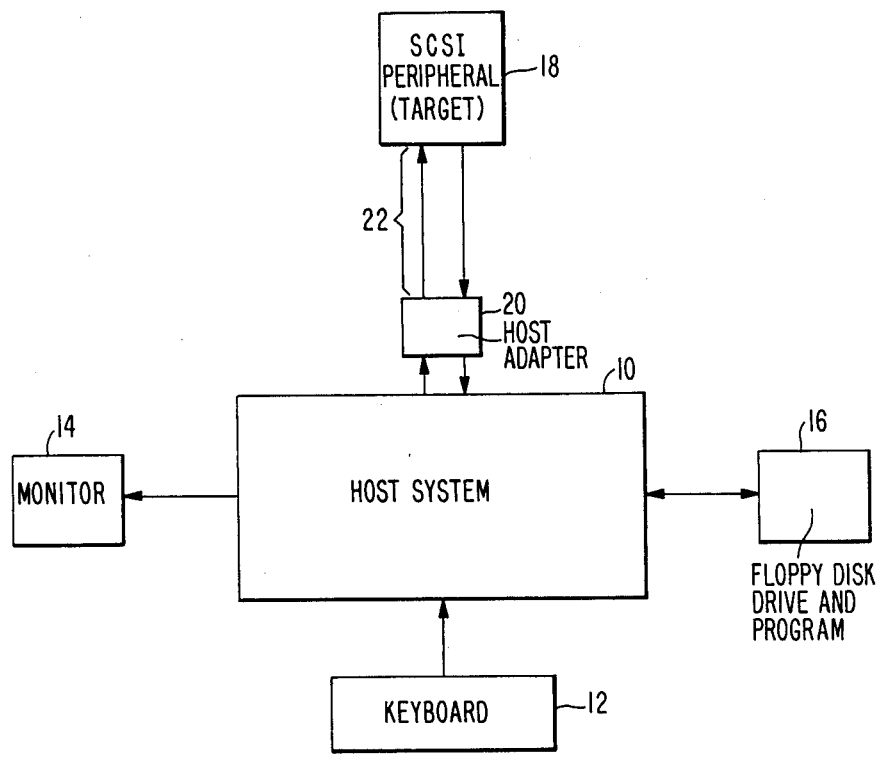
FIG. 1 is a block diagram schematically representing the preferred arrangement of component parts used in practice of the present invention.

In reference to FIG. 1, there is shown a block diagram schematically depicting the preferred arrangement of component parts used in practice of the present invention. A host system 10, typically either an IBM PC/AT, PC/XT or true clone compatible system, is connected in electrical communication with a Keyboard 12, for entering commands and data to the host 10, a monitor 14, for displaying menu selections and the results of analysis operations, and a floppy disk drive 16. The assembly language program which executes the analysis process of the present invention and controls the host system 10 and associated components is loaded in floppy disk drive 16.

An SCSI peripheral, or target, 18 is connected to host system 10 through an SCSI interface, or host bus adapter (HBA) 20. The HBA, such as a Seagate Technologies, Inc., Model ST-01 Host Bus Adapter, allows commands, data and status signals to be sent between the host 10 and the SCSI Bus 22. Although the HBA 20 in FIG. 1 is depicted as a component, separated from the host 10, for demonstrative purposes, the HBA is actually typically installed in one of the open slots located in the PC backplate of the host 10. A target 18 utilizing non-SCSI interfaces, such as an ST-506, ESDI or SMD interface, may also be adapted to the system through the use of an SCSI bridge controller.

Operation of the process of analyzing the target 18 is carried out by accessing the timer chip of the host, a 1.19 MHz timer/counter integrated circuit, such as the IBM PC 8253 (or 8254), for use as a real time clock. The resolution of this frequency is a clock signal of 840 nanoseconds, which is used to measure the amount of time required for the target to perform a specific task associated with its performance, such as the time required to access data, the throughput rate and target overhead.

Upon initialization, the parameters of the target device are either manually entered or, if the target conforms to Common Command Set (CCS) version 4b or later, automatically recognized by the automatic target recognition (ATR) feature of the system, which polls the target for its own configuration and stores the information for subsequent display on the menu selection/results display screen. Target parameters typically consist of: the target manufacturer's name and type of target being tested; SCSI identification number and logical unit number of the target; number of data blocks available for data storage on the target; number of bytes per data block; host adapter type; data and time; and for targets utilizing disk media storage techniques, the number of blocks per track, data blocks per cylinder, and data cylinders, as well as the rotational speed of the disk.

Figure 2:
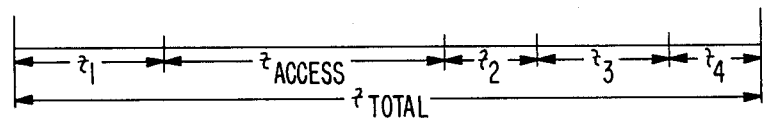
FIG. 2 is a timing diagram depicting the total time required to execute commands to an SCSI target through a host system and how that time is fractionally divided into specific operational tasks.

FIG. 2 illustrates, by means of a timing diagram, the time required for the host 10 to execute a numberof discrete tasks which are combined to form the host overhead, which is a variable primarily dependent on the frequency of the host CPU. In FIG. 2, $t_{TOTAL}$ represents the total amount of time necessary to completely carry out a particular instruction to the target and display the result. $t_{TOTAL}$ may be divided into a number of discrete tasks, represented as follows:

$t_1$ = time required to launch a command on the SCSI bus 22;

$t_2$ = time required to read the status and complete message from SCSI bus 22;

$t_3$ = time required to display the command, status and message on the monitor 14;

$t_4$ = time required to set up execution of the next command; and $t_{ACCESS}$ = time utilized by the target in actually decoding and executing a particular command.

As will be appreciated, the times $t_1$-$t_4$ are all associated with the host system and are subject to wide variations depending on the host clock rate. Thus, by stating the host overhead time ($t_{HO}$) as $$t_{HO} = t_1 + t_2 + t_3 + t_4$$

and subtracting this value from $t_{TOTAL}$, results in $$t_{ACCESS} = t_{TOTAL} - t_{HO}$$

Thus, the process of determining a true measurement of target acess time first requires removing the host overhead time from any reported result.

Figure 3:
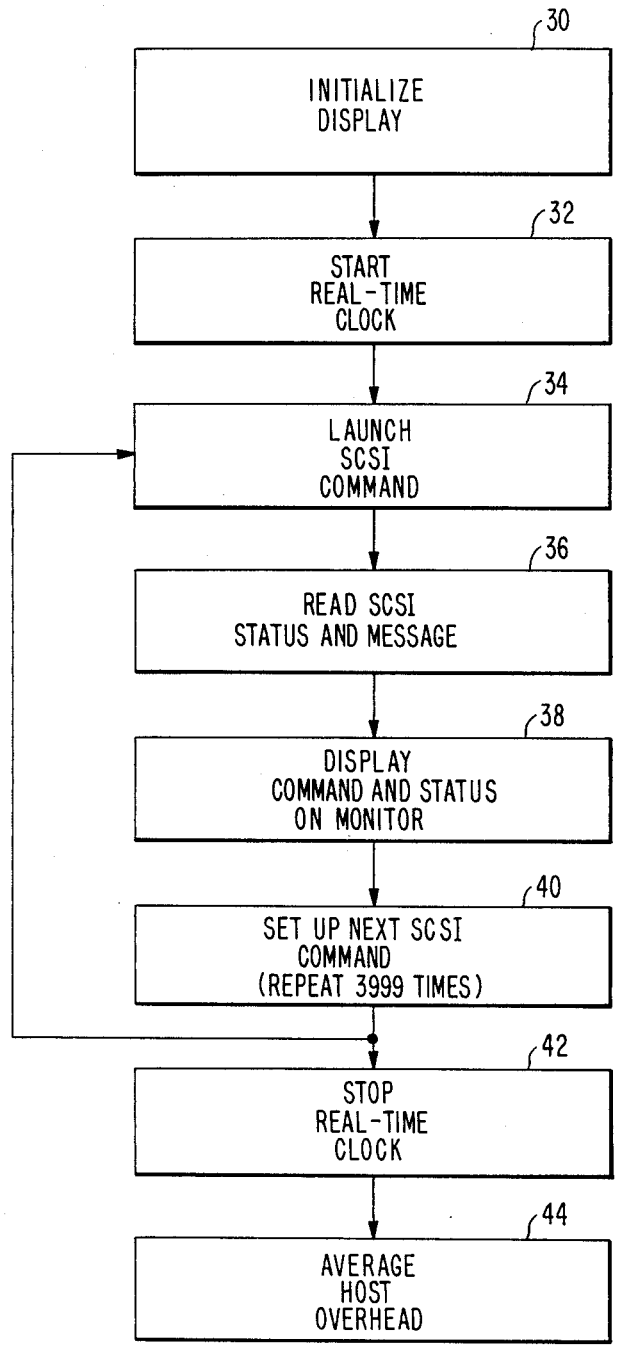
FIG. 3 is a flow diagram depicting the process for calibration of the analysis system to accommodate for host overhead.

A flow diagram depicting the sequence of prompting stimuli required for carrying out the process of calibrating the analysis system to accommodate for host overhead, is shown in FIG. 3. Upon initialization of the host system and analysis program, the program steps through a logical progression of commands beginning with initialize Display 30. The 8253/8254 counter/timer IC is then accessed for use as a real time clock in accord with the prompt Start Real Time Clock 32. The promt Launch SCSI Command 34 causes a command to be issued to a nonexistent target through a nonexistent SCSI bus, the equivalent of $t_1$ above. Accordingly, this process simulates the amount of time required for the host 10 to perform the tasks $t_1$-$t_4$ as described above.

Thus, the prompts Read SCSI Status And Message 36, Display Command And Status On Monitor 38 and Set Up Next SCSI Command 40 correspond to the times $t_2$, $t_3$ and $t_4$ respectively.

At prompt 40, the host overhead test, which singularly consists of the prompts 34–40, is repeated 3999 times to assure reliability and repeatability of the test results. Although longer repeat commands could be utilized, such as 10,000 repeats, a 4000 run test is sufficient to assure accuracy while not over extending the amount of time required to run any particular test. Upon completion of the last host overhead test, the prompt Stop Real-Time Clock 42 releases the PC timer IC. The prompt Average Host Overhead 44 then causes the total time required to run all 4000 host overhead tests to be divided by 4000, thereby giving an average amount of time representative of the host overhead. This host overhead value is saved by the program (and/or displayed on monitor 14, which is comparable to saving the value) and is removed from any reported result throughout the remainder of the testing sequence. Thus, once the host overhead time $t_{HO}$ is calculated and removed from the reported results, the value of $t_{TOTAL}$ will be reduced to the value of $t_{ACCESS}$.

The value of $t_{ACCESS}$ may also be determined by an alternative means which is represented by the following equation:

$$t_{ACCESS} = t_{TARGET\ OVERHEAD} + t_{TRANSFER\ DATA} + t_{SEEK\ POSITIONING} + t_{ROTATIONAL\ LATENCY}$$

Although $t_{ACCESS}$ may be determined by the preceding equation, such a determination will be rather difficult in most instances, due to the process of determining $t_{SEEK\ POSITIONING}$ and $t_{ROTATIONAL\ LATENCY}$, which will be described below. However, because $t_{ACCESS}$ may be determined by subtracting host overhead from the total access time, the value calculated for $t_{ACCESS}$ may be used in the preceeding equation to determine $t_{TARGET\ OVERHEAD}$ and $t_{TRANSFER\ DATA}$, two values which were previously not accurately obtainable due to variations in host clock rates.

The process of determining the value $t_{TRANSFER\ DATA}$ requires the calculation of the aggregate data transfer rate (throughput) of the target, represented by the equation:

$$t_{TRANSFER\ DATA} = \frac{TRANSFER\ LENGTH}{THROUGHPUT\ RATE}$$

where the TRANSFER LENGTH is 1 block of data, typically 512 bytes, and the THROUGHPUT RATE, measured in bytes/second, is the maximum rate at which the target can continuously read or write data. Manufactures typically only measure the throughput rate as the speed at which the target can empty its buffers on the SCSI bus 22. Because the througput rate involves interblock delays, mechanical positioning delays, and buffer delays, a more accurate measurement of the throughput rate would be how fast the target buffer could be continuously filled with target data and emptied on the SCSI bus 22.

Figure 4:
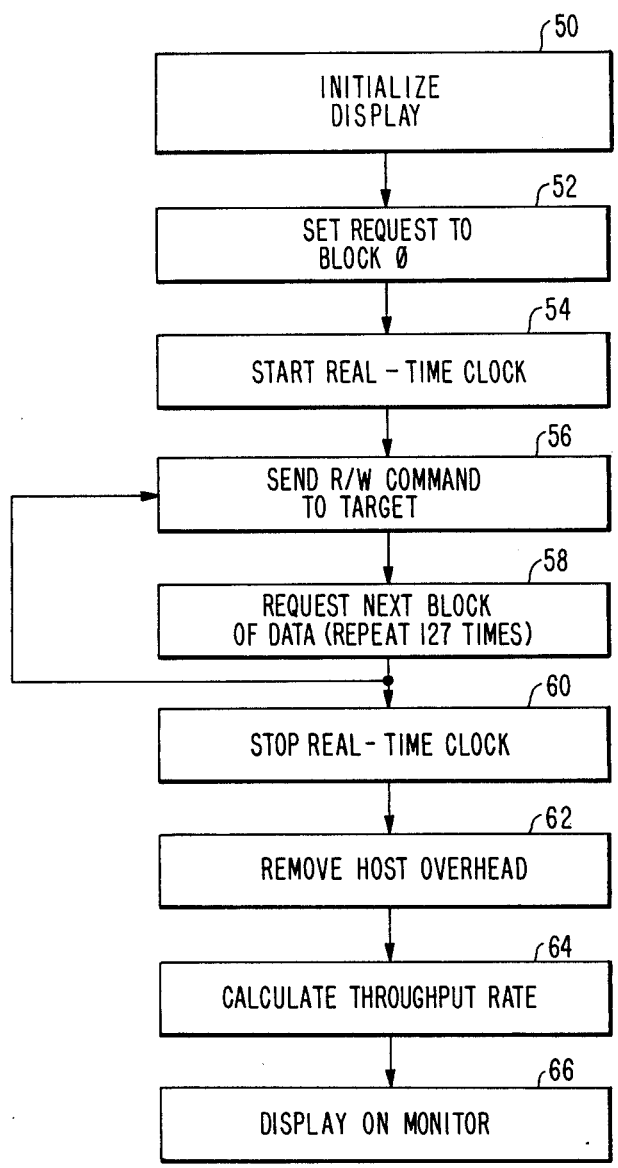
FIG. 4 is a flow diagram depicting the sequence of prompting stimuli required for the process of determining a target's throughout rate.

To accurately determine the throughput rate, it is necessary to make the calculation while carrying out large data transfers, such as transferring 255 blocks of data at a time, which would cause the read/write heads of most disk based storage devices to cross both head and cylinder boundaries. The process of determining the throughput rate is illustrated in FIG. 4, which shows a flow diagram depicting the sequence of prompting stimuli required for determination of the throughput rate. Initialize Display 50 prepares the host system for carrying out the test. Set Request To Block 0 52 provides a known starting point for reading data from or writing data to the target. Once again, Start Real-Time Clock 54 accesses the host timer for initialization of the test. Send R/W Command To Target 56 causes data to be sequentially written on data blocks of the target, such as a default AAAA, FFFF or 6DB6 pattern, and the continuously read from the target. This last prompt leads to the prompt Request Next Block of Data 58 so that the pattern may be repeated on following blocks of data. A sequential stream of data is guaranteed to be read from the target by operating in this fashion, and repeating the test 127 additional times, assures that all possible delays that would typically occur are experienced by the target during the test.

Stop Real-Time Clock 60 releases the timer after the last block is read. Remove Host Overhead 62 causes the previously calculated host overhead $t_{HO}$ to be subtracted from the total accumulated transfer time. The next prompt, Calculate Throughput Rate 64, applies the following algorithm:

$$THROUGHPUT\ RATE = \frac{(R)(Q)(Block\ Size)}{Transfer\ Time}$$

where R represents the number of times the test was run (in this case 128 times), Q represents the quantity of blocks of data read at each request (in this case 255), Block Size is a variable parameter of the target representing the number of bytes/block, and Transfer Time is the total time required to run the test. This calculated value is then stored for use by the prompt Display on Monitor 66 and application to the $t_{TRANSFER\ DATA}$ formula outlined above.

Once the host overhead and throughput rates are known, the target overhead may be calculated by restricting data access to only data on a single track. Thus, no track-to-track seeking is required and $t_{SEEK\ POSITIONING}$ would be zero. In addition, if the access to blocks of data on the selected track is restricted to a single track, $t_{ROTATIONAL\ LATENCY}$ can be reduced to a calculatable value, which is otherwise not easily determinable.

Cylinder and data address information is typically located at one particular location on a track. To access a particular block of data on a track, the cylinder and data address information must first be detected before the data block may be accessed. A block of data located just after the address location would be accessed in less time than data blocks located at other locations on the track. Thus, by accessing data on the tracks in a predetermined pattern, it is possible to calculate the average amount of time required to access the blocks on the track during the test.

Figure 5:
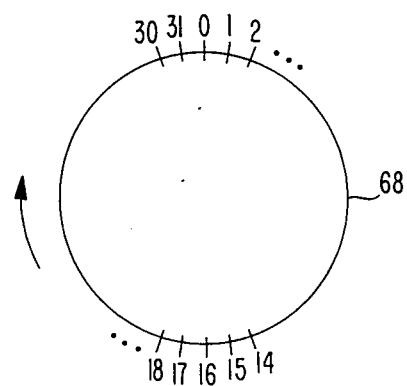
FIG. 5 is a diagrammatic representation of the ordering sequence of a number of blocks of data on a particular track of a disk drive.

If a single track or cylinder 68 of a disk based system, comprised of 32 blocks per track, could be represented as shown in FIG. 5, the ordering process may be detailed as follows:

0, 31, 1, 30, 2, 29, 3, 28, 4, 27, 5, 26, 6, 25, 7, 24, 8, 23, 9, 22, 10, 21, 11, 20, 12, 19, 13, 18, 14, 17, 15, 16, 16, 15, 17, 14, 18, 13, 19, 12, 20, 11, 21, 10, 22, 9, 23, 8, 24, 7, 25, 6, 26, 5, 27, 4, 28, 3, 29, 2, 30, 1. By accessing blocks of data on a particular track as shown above, all possible distances between any two blocks on the track are represented when the target access time is measured. The calculation of rotational latency may then be presented as follows:

$$t_{ROTATIONAL\ LATENCY} = \sum_{\phi}^{n} \text{Time between all possible distances}/n$$

$$= 1/2 \text{ Revolution Time}$$

where n is the number of pairs of blocks accessed.

As will be appreciated, rotational latence can therefore be calculated as a predictable value because the sum of all times, divided by the number of pairs of blocks accessed (such as 0, 31 or 1, 30), is approximately equal to the average amount of time required to access data block 16 of FIG. 5, when the address location information is located at block 0. The typical rotation speed for hard disk systems is 3600 RPM, so the rotational latency may be translated into ½ of a revolution, which takes 8.33 milliseconds to complete.

Figure 6:
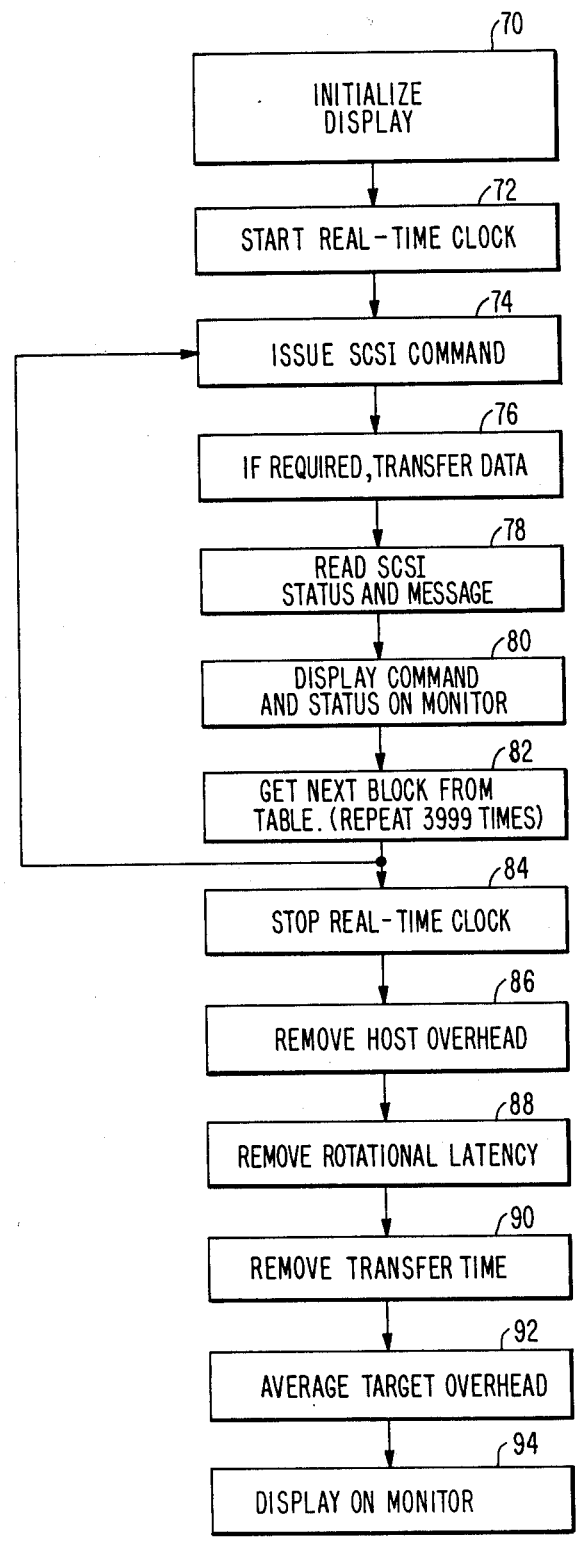
FIG. 6 is a flow diagram depicting the sequence of prompting stimuli required for the process of determining target overhead.

Upon determination of the above values, the average target overhead may be calculated according to the prompting stimuli represented in FIG. 6. Initialize Display 70 and Start Real-Time Clock 72 initialize the test. Issue SCSI Command 74 causes a command, requesting access to data blocks on a single contiguous track to be issued on the SCSI bus 22. Depending upon the type of command issued, Transfer Data 76 either causes data associated with read or write commands to be transferred across the bus 22. Upon process of the read/write command, Read SCSI Status And Message 78 causes the status of the target and the complete message (meaning the command is completed) from the SCSI to be read by the host 10. The result of the Read 78 is displayed on the monitor 14 by the prompt Display Command And Status On Monitor 80. Get Next Block From Table 82 establishes the process of selecting the next block to be accessed according to the ording system depicted by FIG. 5 and described above. This process is repeated 3999 times to assure accuracy and repeatability.

After the last block of data on the track is accessed, Stop Real-Time Clock 84 releases the PC timer. The time required for the test to run through the flow chart of prompts up to prompt 84 is representative of the total access time for both the host and the target combined. Remove Host Overhead 86 removes the previously calculated host overhead time value. Removal of Rotational Latency 88 results in the previously calculated rotational latency value being subtracted. There is no seek positioning time because no track-to-track seek was required while data access was restricted to a single track. Remove Transfer Time 90 also subtracts a previously calculated value from the total access time represented. The prompt Average Target Overhead 92 causes the resultant value output from prompt 90 to be divided by 4000 resulting in the calculated average value representing the target overhead time. Display On Monitor 94 displays on monitor 14 this (target overhead) value representing the amount of time required by the target to decode a particular command and process it.

As previously stated, a crucial performance characteristic of most targets is its ability to access data locations. When a target is requested to store, or write, some quantity of information, it will start from the last positioned accessed and seek to the next available data location for writing. Likewise, a read request to the target will cause the read/write head of the target to seek the position where the desired information is stored. The actual time required to write or read data to or from the magnetic or optical recording material of the target is typically minute in comparison to the amount of time required to seek the location. In other words the time required to mechanically position the read/write head in the desired position comprises a majority of time that is required to seek. The faster a target is capable of seeking a particular quantity of available storage locations, the more invaluable that target becomes.

Figure 7:
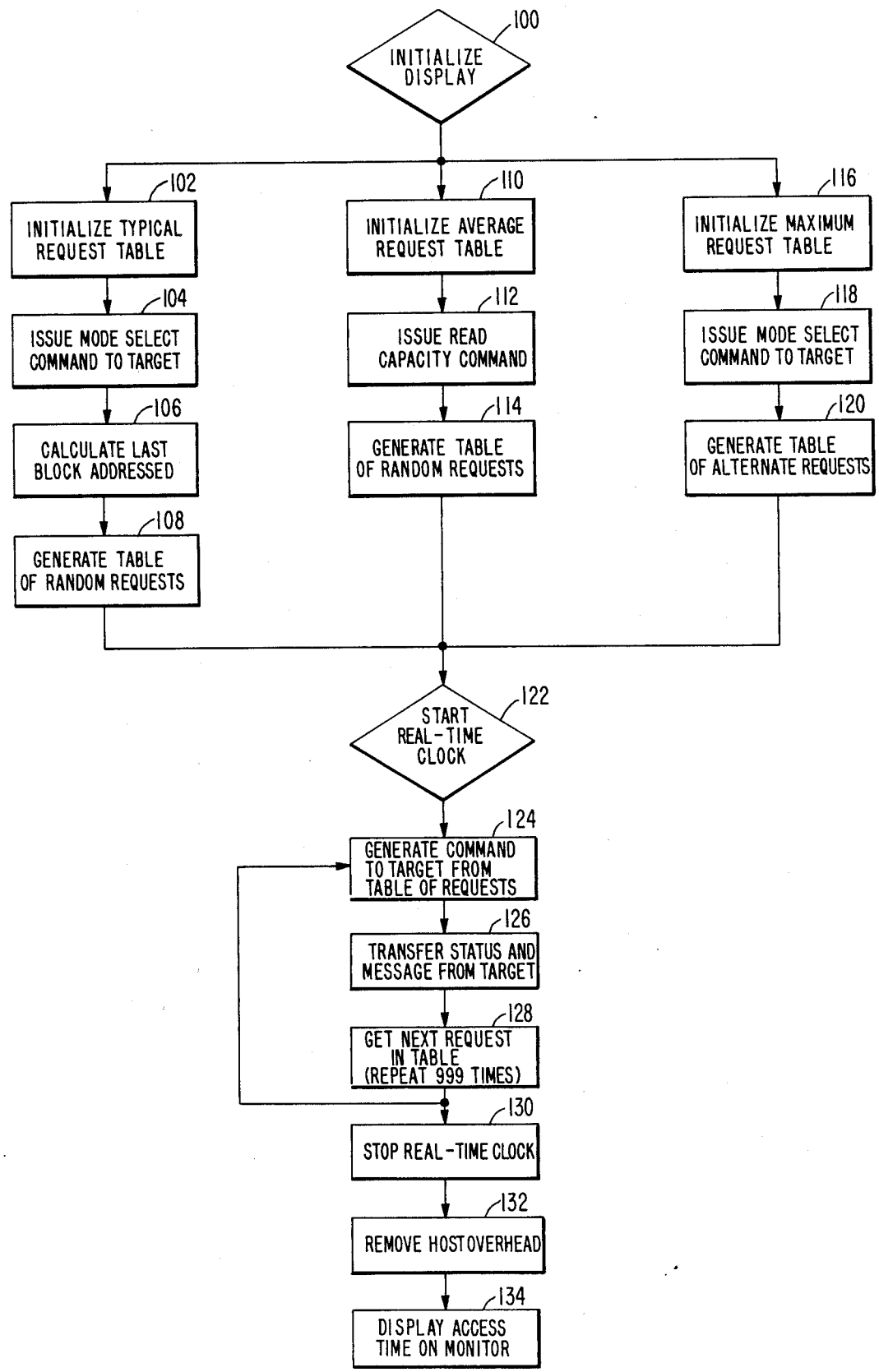
FIG. 7 is a flow diagram depicting the sequence of prompting stimuli required for determining typical, average, and maximum access time measurements.

Determination of the amount of time required to seek to certain data locations, and if desired, carry out certain operations, may be expressed by the flow chart depicted in FIG. 7. The flow chart of FIG. 7 depicts three standardized tests that are performed to determine performance characteristics of target devices. Access times can generally be thought of as a range of values where: typical access time represents the amount of time required to access spatially located data tracks; maximum access time represents the amount of time required to accress data on tracks located maximum distances apart on the recording surfaces of the target drive; and average access time represents the time required to access data on randomly located tracks on all surfaces of the target drive. By calculating all three of these access time values in response to a particular command, a range of best, worst and average access times to data for a particular target may be determined.

As previously stated, access time may be calculated according to the following formula:

$$t_{TOTAL} = t_{HOST\ OVERHEAD} + t_{TARGET\ OVERHEAD} +$$

$$t_{SEEK\ POSITIONING} + t_{ROTATIONAL\ LATENCY} + t_{DATA\ TRANSFER}$$

Likewise, target access time, the time required to access data at requested locations, may be calculated as follows:

$$t_{ACCESS} = t_{TOTAL} - t_{HOST\ OVERHEAD}$$

Because the target overhead value and data transfer time can be calculated as described above, the target access time is really a representation of the mechanical positioning time required to seek to a location and read or write data.

The process of either determining the typical, average or maximum access time for a seek, read, or write is most accurate when the same data locations are accessed in accordance with each command. In addition, each command can be configured in a number of different ways. For example, a typical seek, read, or write command each may comprise a 6 byte command, or in an extended mode, each command may comprise a 10 byte command, the difference between the two being that the extended mode contains additional address information and therefore can access more data.

FIG. 7 depicts the flow diagram of each access time test and the similarity between the three as a single flow chart, for explanatory purposes only. Typically, each test is processed separately, rather than simultaneously as shown in FIG. 7.

After initialize Display 100, either the Typical Request Table 102, Average Request Table 110, or Maximum Request Table 116 may be selected. If the typical access time is selected, the prompt initialize Typical Request Table 102 initiates the process of determining the typical request table, which generally comprises the first two cylinders of a target. Issue Mode Select Command To Target 104 prompts the determination of the number of blocks per cylinder within the requested table. Calculate Last Block Addressed 108 prompts the multiplication of the number of blocks per cylinder by 2 and subtracts 1 to determine the last possible accessible block that could be addressed during the test. Generate Table Of Random Requests 108 prompts the determination of the range of blocks that may be randomly accessed between block 0 and the next to last block of the second cylinder. Once the table of addressable blocks of data has been determined, the test proceeds in the same fashion as the two remaining, yet to be described, tests.

If the average access time is selected, the prompt Initialize Average Request Table 100 initiates the process of determining the average request table, which generally comprises all available data blocks on all tracks of the target. Issue Read Capacity Command 112 prompts the determination of the total number of blocks available on the target and Generate Table of Random Requests 114 prompts the subtraction of one from the value calculated in response to prompt 112 to create the range of blocks that may be randomly accessed during the test.

If the maximum access time is selected, the prompt Initialize Maximum Request Table 116 initiates the process of determining the maximum request table, which generally comprises the inner and outer most available cylinders of the target. Issue Model Select Command To Target 118 prompts the determination of the number of blocks per cylinder within the requested table, which is similar to the function of prompt 104, except in the later, the table is restricted to the first and last cylinders rather than the first two cylinders. Generate Table of Alternate Requests 120 provides the same prompts as prompts 106 and 108, except in the later, the blocks/cylinder multiplied by 2 are the first and last. Once again, one block is subtracted from the total to determine the last possible accessible block of data that could be addressed during the test. Thus, the range of blocks randomly accessible during the test comes between block 0 of cylinder 0 and the next to last block of the last cylinder.

Upon generation of the table of randomly accessible blocks of data in accordance with prompts 108, 114 or 120, the test proceeds to the Start Real-time Clock 122 prompt to initialize the actual test. Generate Command To Target From Table Of Requests 124 prompts the selection of a block or blocks of data in accordance with randomly selected values derived from the appropriate previously determined table of blocks. Transfer Status and Message From Target 126 prompts the communication of request results from the target to the host 10. Get Next Request In Table 128 loops the test back to randomly selecting another access request from the appropriately selected table.

Each seek, read, write, extended seek, extended read, or extended write, is then repeated 999 times to assure reliability. The prompt Stop Real-Time Clock 130 releases the PC timer. Remove Host Overhead 132 causes the previously determined host overhead value to be subtracted from each reported value before the prompt Display Access Time Monitor 134 assures the reporting of the derived value.

Although reported target access times include target overhead time in the total in order to assimilate more true-to-life access time values, the amount of time required for data transfer and target overhead may be calculated and displayed for each access time command to demonstrate additional timing considerations characteristic of the target.

The preceeding process and system is not limited to usage on personal computers alone, rather it may be expanded to usage on mini-computers, main frame systems and networks of computers where a separate timer IC is accessible for establishing a real-time clock, independent of the host clock rate. In addition, the process of the present invention is not limited to usage with typical computer peripherals, but may also be used wherever it is necessary to determine the performance characteristics of an intelligent communicatable subsystem or component independent of other system components. It is anticipated that other embodiments and/or alterations or modifications of the present invention will become apparent to those skilled in the art after having read this disclosure. Accordingly, it is intended that the following claims be interpreted to cover all such alterations or modifications as fall within the true spirit and scope of the invention.

What is claimed is:

1. A method for determining a target access time for a computer peripheral by accommodating for variations in a clock rate of a host system comprising the steps of:
   determining a host overhead time;
   selecting a range of data storage sites in the peripheral to be accessed;
   determining a total access time required by the peripheral to decode and process a selected command communicated to the peripheral; and
   subtracting said host overhead time from said total access time to determine said target access time.

2. A method for determining a target access time for a computer peripheral as recited in claim 1 wherein the step of determining said host overhead time includes the steps of:
   (a) establishing a standard clock signal and commencing its generation;
   (b) issuing an operation command to a disabled peripheral port;
   (c) reading a response signal from the disabled peripheral port;
   (d) displaying said response signal;
   (e) terminating generation of said clock signal; and
   (f) determining the time elapsed from commencement to termination of said clock signal as a first measure of said host overhead time.

3. A method for determining a target access time for a computer peripheral as recited in claim 2 wherein the step of determining said host overhead time further includes the steps of:
   (g) following display of said response signal, setting up a next operation command to be issued to said disabled peripheral port;
   (h) repeating steps (b), (c), (d), and (g) a predetermined number of times; and
   (i) following termination of the generation of said clock signal, dividing the time elapsed from commencement of said clock signal through step (h) by the number of times step (h) was repeated to provide a second measure of said host overhead time.

4. A method for determining a target access time for a computer peripheral as recited in claim 1 wherein the step of selecting said range of data storage sites is accomplished by selecting a range from a class of ranges consisting of (a) two adjacent cylinders of a disk media storage device, (b) randomly selected cylinders of a disk media storage device, and (c) an inner most cylinder and an outer most cylinder of a disk media storage device.

5. A method for determining a target access time for a computer peripheral as recited in claim 1 wherein the step of selecting a range of data storage sites includes generating a table of randomly selectable storage sites and wherein the step of determining said total access time includes the steps of:
   (a) establishing a standard clock signal and commencing its generation;
   (b) randomly selecting a storage site from said table;
   (c) communicating an operation command to said peripheral causing it to execute said command at the selected storage site and develop an operation completed message;
   (d) obtaining the completed message from said peripheral;
   (e) terminating generation of said clock signal;
   (f) determining the time elapsed from commencement to termination of said clock signal as a first measure of said total access time; and
   (g) displaying said total acces time.

6. A method for determining a target access time for a computer peripheral as recited in claim 5 wherein the step of determining said total access time further includes the steps of:
   (h) following obtainment of the completed message from said peripheral, setting up a next operation command to be communicated to said peripheral for execution at a next randomly selected storage site;
   (i) repeating steps (b), (c), (d), and (h) a predetermined number of times; and
   (j) following termination of the generation of said clock signal, dividing the time elapsed from commencement of said clock signal through step (i) by the number of times step (i) was repeated to provide a second measure of said total access time.

7. A method for determining a target access time for a computer peripheral by accommodating for variations in a clock rate of a host system comprising the steps of:
   (a) determining a host overhead time;
   (b) determining a target overhead time for said peripheral;
   (c) determining a data transfer time for said peripheral;
   (d) determining a seek positioning time for said peripheral;
   (e) determining a rotational latency time for said peripheral; and
   (f) adding the times determined in steps (b) through (e) to provide a measure of said target access time.

8. A method for determining a target access time for a computer peripheral as recited in claim 7 wherein said computer peripheral is a disk media storage device and wherein the step of determining said target overhead time includes the steps of:
   (a) establishing a standard clock signal and commencing its generation;
   (b) communicating a command to said peripheral causing it to perform an operation on a preselected track of said peripheral and generate a response signal;
   (c) obtaining and displaying said response signal;
   (d) terminating generation of said clock signal;
   (e) determining the time elapsed from commencement to termination of said clock signal as a measure of said total access time; and
   (f) subtracting said host overhead time, said data transfer time, said seek positioning time and said rotational latency time from said measure of said total access time to provide a first measure of said target overhead time.

9. A method for determining a target access time for a computer peripheral as recited in claim 8 wherein the step of determining said target overhead time further includes the steps of:
   (g) following display of said response signal, setting up a next command to be communicated to said peripheral;
   (h) repeating steps (b), (c), and (g) a predetermined number of times; and
   (i) following termination of the generation of said clock signal, dividing the time elapsed from commencement of said clock signal through step (h) by the number of times step (h) was repeated to provide a second measure of said target overhead time.

10. A method for determining a target access time for a computer peripheral as recited in claim 7 wherein the step of determining said data transfer time includes the steps of:
   determining a throughput rate for data transferred from said peripheral to said host system;
   causing said peripheral to transfer a predetermined quantity of data to said host system; and
   dividing said predetermined quantity of data transferred by said first throughput rate.

11. A method for determining a target access time for a computer peripheral as recited in claim 10 wherein the step of determining said throughput rate comprises the steps of:
   (a) establishing a standard clock signal and commencing its generation;
   (b) communicating a read or write operation command to said peripheral causing it to perform said command on a preselected quantity of data storage sites in said peripheral;
   (c) terminating generation of said clock signal;
   (d) determining the time elapsed from commencement to termination of said clock signal to provide a measure of a system data transfer time;
   (e) subtracting said host overhead time from said system data transfer time to provide a measure of a target data transfer time;
   (f) dividing said quantity of data storage sites by said target data transfer time as a first measure of said throughput rate; and
   (g) displaying said throughput rate.

12. A method for determining a target access time for a computer peripheral as recited in claim 11 wherein the step of determining said throughput rate further comprises the steps of:
   (h) following communication of said command, setting up a next command to be communicated to said peripheral that will cause it to perform said next command on a preselected quantity of data storage sites sequentially occurring after any previously preselected quantity of data storage sites;
   (i) repeating steps (b) and (h) a predetermined number of times; and
   (j) following subtraction of said host overhead time from said system data transfer time, dividing said preselected quantity of data storage sites by said target data transfer time to provide a second measure of said throughput rate.

13. A method for determining a target access time for a computer peripheral as recited in claim 7 wherein said computer peripheral is a disk media storage device and wherein the step of determining said rotation latency time comprises the steps of:
selecting a particular track on said peripheral;
accessing a number of blocks of data in said track in a predetermined sequence, said sequence including accessing different pairs of blocks of data, said pairs of blocks of data having respective separations between which include all possible separations between any pair of blocks of data on said track; and
dividing the time required to access said pairs of blocks of data by the number of said pairs of blocks of data accessed to provide a measure of said rotational latency time.

* * * * *